UNITED STATES PATENT OFFICE.

SYDNEY T. WRIGHT, OF ST. THOMAS, ONTARIO, CANADA.

MEDICINE FOR RHEUMATISM.

SPECIFICATION forming part of Letters Patent No. 308,940, dated December 9, 1884.

Application filed May 19, 1884. (No specimens.) Patented in Canada September 21, 1883, No. 17,707.

*To all whom it may concern:*

Be it known that I, SYDNEY T. WRIGHT, a subject of the Queen of Great Britain, residing at St. Thomas, in the county of Elgin and Province of Ontario, Dominion of Canada, have invented a new and useful Composition of Matter to be Used Internally for the Remedy of Rheumatic Complaints, of which the following is a specification.

My composition consists of the following ingredients combined in the proportions stated, namely: Oil of juniper, one ounce; oil of turpentine, one ounce; rectified spirits of wine, one-half ounce; iodide of potassium, one dram; water, one ounce. These ingredients are to be thoroughly mingled by agitation.

In using the composition, five drops are to be administered to a child five years of age, and one drop is to be added for each additional year of the patient's age up to sixteen. From sixteen years of age and upward the patient will take from twenty to thirty-five drops in a wine-glass of water before retiring.

What I claim as my invention is—

The herein-described composition of matter to be used internally for the remedy of rheumatic complaints, consisting of oil of juniper, oil of turpentine, spirits of wine, iodide of potassium, and water, in the proportions specified.

SYDNEY T. WRIGHT.

Witnesses:
ALEXANDER FRASER,
JOHN L. PETERS.